US012683042B2

(12) United States Patent
Egerer et al.

(10) Patent No.: US 12,683,042 B2
(45) Date of Patent: Jul. 14, 2026

(54) METHOD FOR PRODUCING COAXIAL CABLES HAVING A THIN-WALLED, RADIALLY CLOSED OUTER CONDUCTOR

(71) Applicant: NEXANS, Courbevoie (FR)

(72) Inventors: Ralf Egerer, Hannover (DE); Olaf Petersen, Hannover (DE); Steven Dinkel, Hannover (DE)

(73) Assignee: NEXANS, Courbevoie (FR)

( * ) Notice: Subject to any disclaimer, the term of this patent is extended or adjusted under 35 U.S.C. 154(b) by 669 days.

(21) Appl. No.: 17/764,455

(22) PCT Filed: Sep. 16, 2020

(86) PCT No.: PCT/EP2020/075861
§ 371 (c)(1),
(2) Date: Mar. 28, 2022

(87) PCT Pub. No.: WO2021/063682
PCT Pub. Date: Apr. 8, 2021

(65) Prior Publication Data
US 2024/0055158 A1 Feb. 15, 2024

(30) Foreign Application Priority Data

Sep. 30, 2019 (EP) ..................................... 19306240

(51) Int. Cl.
*H01B 13/016* (2006.01)
*B23K 26/21* (2014.01)
(Continued)

(52) U.S. Cl.
CPC ........... *H01B 13/016* (2013.01); *B23K 26/21* (2015.10); *H01B 13/0003* (2013.01); *H01B 13/0009* (2013.01); *H01B 13/0016* (2013.01); *H01B 13/2626* (2013.01); *H01B 13/264* (2013.01); *H01B 13/0165* (2013.01)

(58) Field of Classification Search
CPC .............. H01B 13/016; H01B 13/2626; H01B 13/264; H01B 13/0003; H01B 13/0009;
(Continued)

(56) References Cited

U.S. PATENT DOCUMENTS 5,515,603 A 5/1996 Ziemek et al.
2015/0162729 A1 6/2015 Reversat et al.
(Continued)

FOREIGN PATENT DOCUMENTS

JP H09220682 8/1997
JP 2013042271 A * 2/2013

OTHER PUBLICATIONS

Hochberg et al, "Propagation characteristics of coaxial cable with a helically wound ground shield", 1996 Proceedings 46th Electronic Components and Technology Conference, Orlando, FL, USA, 1996, pp. 888-892. (Year: 1996).*

(Continued)

*Primary Examiner* — A. Dexter Tugbang
(74) *Attorney, Agent, or Firm* — MUNCY, GEISSLER, OLDS & LOWE, P.C.

(57) ABSTRACT

A method for the continuous production of coaxial cables (224) having a thin-walled, radially closed outer conductor of nonferrous metal comprises supplying a flat strip of the nonferrous metal to a shaping apparatus (212), wherein the thickness of the strip corresponds to the wall thickness of the coaxial cable. The shaping apparatus is configured to continuously shape the supplied flat strip into a form corresponding to the outer conductor of the coaxial cable and around a cable core supplied before the outer conductor is closed. After the shaping, two opposite edges of the flat strip lie flush against one another in a contact region and are continuously welded to one another by a welding apparatus (216) by means of a laser, which radiates light having a (Continued)

wavelength smaller than 600 nm. The laser heats a point in a welding region that has a diameter smaller than 20% of the cross-sectional dimension of the coaxial cable. The welded coaxial cable is drawn off from the welding region and, after introducing a parallel or helical corrugation, is received in a receiving device (226).

7 Claims, 4 Drawing Sheets

(51) Int. Cl.
  *H01B 13/00*　　　(2006.01)
  *H01B 13/26*　　　(2006.01)
(58) Field of Classification Search
  CPC ............ H01B 13/0016; H01B 13/0165; B23K 26/20; B23K 26/21; B23K 26/211; B23K 26/24; B23K 26/32
  See application file for complete search history.

(56)　　　　　　References Cited

U.S. PATENT DOCUMENTS

| | | | | |
|---|---|---|---|---|
| 2015/0375339 | A1* | 12/2015 | Sterling | ................. B23K 26/21 |
| | | | | 219/121.72 |
| 2016/0178581 | A1* | 6/2016 | Todorov | ................. B23K 26/21 |
| | | | | 324/240 |
| 2017/0036302 | A1* | 2/2017 | Okuda | ................. B23K 26/211 |
| 2017/0095885 | A1* | 4/2017 | Zhang | .................... B23K 26/21 |
| 2017/0133130 | A1* | 5/2017 | Harwath | ............. H01B 13/016 |
| 2017/0312854 | A1 | 11/2017 | Soika et al. | |

OTHER PUBLICATIONS

Mohammed Naeem. "Laser processing of reflective materials" Jan. 31, 2013 (Jan. 31, 2013).
International Search Report dated Sep. 28, 2020.
Search Report dated Jul. 20, 2021.

* cited by examiner

METHOD FOR PRODUCING COAXIAL CABLES HAVING A THIN-WALLED, RADIALLY CLOSED OUTER CONDUCTOR

RELATED APPLICATION

This application is a National Phase of PCT/EP2020/075861 filed on Sep. 16, 2020, which claims the benefit of priority from European Patent Application No. 19 306 240.3, filed on Sep. 30, 2019, the entirety of which are incorporated by reference.

FIELD

The invention relates to the production of coaxial cables having an outer conductor of nonferrous metals, in particular the continuous production of such cables having thin-walled outer conductors.

BACKGROUND

Thin-walled, radially closed hollow profiles, in particular having a circular cross section, can be used as the outer conductors of RF cables or coaxial cables. An inner conductor encased by a dielectric is then arranged in the center of such a hollow profile. The dielectric may for example comprise a plastics material having a suitable relative dielectric constant, but it is also possible for the inner conductor to be separated from the outer conductor substantially only by air or another electrically non-conductive gas consist. For this purpose, it is possible to hold the inner electrical conductor in the middle of the hollow profile by means of spacers arranged at intervals, or to make use of a large-pored, foamed plastic which predominantly contains air or the gas. In order to achieve better flexibility, which is required for laying in different directions with the smallest possible bending radii, of the coaxial cable and at the same time to obtain a dimensionally stable outer conductor, the outer conductor of the coaxial cable is provided with a helical or parallel corrugation, as is shown by way of example in FIG. 4. The corrugating process requires the most uniform possible wall thickness of the hollow profile forming the outer conductor, while at the same time the thinnest possible wall thickness is desirable for material saving and cost saving reasons. In addition, it is desirable for the outer conductor to be produced in a continuous process in order to be able to produce longer cohesive coaxial-cable lengths.

In the case of a continuous process for producing coaxial cables, a cable core consisting of inner conductor and dielectric is supplied to a tube-forming process. During the tube-forming process, a flat strip of a nonferrous metal, e.g. copper, is formed into a tube which is slotted in a longitudinal direction and which encases the cable core. The flat strip formed into a tube is welded with a longitudinal seam along the slot and then corrugated.

The welding is performed by means of arc welding methods, such as tungsten inert gas welding (TIG). However, this means that wall thicknesses smaller than 0.15 mm cannot be welded reliably. The tubes welded using the known arc welding method also exhibit a pronounced weld bead, which projects into the tube interior and adversely affects the electromagnetic properties of the coaxial cable. Furthermore, tubes having a weld diameter smaller than Ø4.0 mm cannot be produced using the known method. As a result, the dimensioning of the corrugated tube which forms the outer conductor has a lower limit, and therefore so does the minimum diameter of the coaxial cable. This in turn leads to a greater minimum bend radius of the coaxial cable.

Hollow profiles of nonferrous metals, e.g. copper or aluminum, are especially suitable for certain applications. In particular, copper tubes can also be is used as electrical shields or outer conductors in coaxial cables or for waveguides. In coaxial cables, thin-walled hollow profiles having comparatively small diameters and small wall thicknesses are required, among other things in order to keep the use of materials and the weight low. In particular, it is no longer possible to produce wall thicknesses smaller than 0.15 mm reliably and with the required quality of the weld seam by means of arc welding, irrespective of the diameter of the pipe. Hollow profiles of nonferrous metals having wall thicknesses and diameters which are smaller than those mentioned must therefore imperatively be brought to the respectively desired final dimension by processing steps that follow the actual tube production. Since in the case of the continuous production of long coaxial lines, the inner conductor and the insulation must be introduced into the flat strip, which is made of nonferrous metal and which is formed into a slotted hollow profile, already before the welding, drawing processes for reducing the wall thickness can no longer be used after the welding. The hollow profile must thus already be produced from a material having the desired wall thickness.

In principle, it is advantageous if coaxial conductors are produced in a largely continuous production process that must be interrupted as infrequently as possible in order to obtain the longest possible pieces. If appropriate, pieces of a required length can then be cut from the long coaxial conductors, with only a small amount of cutting remains remaining, if any. In general, of course, any saving of process steps during the production is advantageous.

It is therefore an object of the invention to specify a method and an apparatus which reduce the amount of material needed to continuously produce long lengths of coaxial cables and make it possible to reduce the weight of the cable.

SUMMARY OF THE INVENTION

This object is achieved by the method specified in claim 1. Further developments and embodiments are specified in the respective dependent claims.

In the method according to the invention for the continuous production of thin-walled coaxial cables, in particular also those having a small cross section, is firstly a flat strip of a nonferrous metal is supplied that has a thickness corresponding to the wall thickness of the outer conductor of the coaxial cable to be produced. The width of the metal strip supplied preferably already corresponds to the circumference of the outer conductor of the coaxial cable. If the metal strip supplied is wider than is required by the circumference of the outer conductor of the coaxial cable, or if the edges of the metal strip are not sufficiently smooth, the metal strip can be trimmed to size on one or two sides in a continuous process during the supplying operation. In the present description, the expression "coaxial cable having a small cross section" refers to coaxial cables having cross sections of a few millimeters. The expression "thin-walled" refers to wall thicknesses of a few tenths of a millimeter, in particular less than 0.15 mm. The term nonferrous metal is used in the present description both for the metals themselves and for their alloys.

The metal strip, which has the appropriate width, is formed into a hollow profile, which has the desired cross section and which forms the outer conductor of the coaxial cable, in a one-stage or multiple-stage continuous shaping process. The shaping process may include a bending operation in multiple stages in succession in the longitudinal direction of the strip, for example on appropriately configured rollers and profiles. In this context, the cross section may be round, oval or else any desired polygonal shape. Before or during the shaping process, before the hollow profile is closed, the cable core, which comprises an inner conductor encased with a dielectric, is supplied. The cable core may comprise further layers.

After the shaping, the hollow profile, which has received the cable core, has a region which runs in the longitudinal direction of the hollow profile and in which the edges of the metal strip rest flush against one another. The edges of the hollow profile that rest flush against one another are now welded to one another along the abutting edge and thus closed radially. According to the invention, the welding is performed using a laser that radiates light at a wavelength smaller than 600 nm, preferably in a range between 550 and 450 nm. According to the invention, use may also advantageously be made of wavelengths in a range below 450 nm. The laser introduces light energy into a point in the welding region, and when the light energy impinges on the surface of the welding material, it is absorbed and converted to heat. Light in the wavelength ranges mentioned of which use is made according to the invention is absorbed by many nonferrous metals even at room temperature very much better than for example light in the infrared spectrum having wavelengths above about 800 nm. In fact, even at wavelengths above about 600 nm, light is absorbed by many nonferrous metals only so poorly that lasers having particularly high output power and special cooling measures would be required to weld the nonferrous metal. Furthermore, at wavelengths greater than 600 nm, the absorption is strongly dependent on the surface finish, whereas the influence of the surface finish is greatly reduced at the wavelengths of which use is made according to the invention. In addition, on account of the strong temperature dependence of the absorption, specifically at greater wavelengths, the energy introduced into the active welding region moreover needs to be regulated quickly, this being almost impossible to implement; therefore, the quality of the weld seam can fluctuate greatly. The use according to the invention of light having wavelengths smaller than 600 nm creates a more stable melt pool and results in an overall more stable process which, along with a high energy efficiency of the welding process, provides hollow profiles which are welded with a longitudinal seam and which have a high quality and produces less rejected parts. In addition, at the wavelength smaller than 600 nm of which use is made according to the invention, it is possible to dispense with preparation of the welding region, which reduces the reflection and thereby increases the absorption of the laser light. The welding region thus does not need to be roughened or preheated, for example, and there is also no need to apply in the welding region a layer of a substance which as an "intermediary" converts the light energy that has been radiated in to heat and discharges it to the welding material, with the result that its temperature-dependent absorptivity enters the regions that are more favorable for the wavelengths used. This eliminates the risk that parts of the substance that is used as an intermediary enter the weld seam.

The absorbed light causes the metal to heat up considerably. In order to is introduce a sufficiently high amount of energy into the material to be welded, the light must be intensely focused. Intense focusing is therefore also required because the welding is intended to take place only in the contact region of the edges along the slot. Owing to heat conduction within the nonferrous metal, regions directly adjoining the impingement point of the laser beam can likewise heat up considerably and possibly melt. Specifically in the case of small cross-sectional dimensions of the hollow profiles to be produced, for example in the case of diameters smaller than 4 mm, the focusing of the laser beam is therefore of major importance in order to avoid the uncontrolled flow-off of liquefied material, or a breakaway of material. In the method according to the invention, the laser beam has a diameter of at most 20% of the cross-sectional dimensions of the hollow profile, preferably less than 10%, on the workpiece. Tests have shown that diameters of the laser beam down to 5% of the cross-sectional dimensions can still enable good-quality weld seams, it being possible in this case for further measures to be necessary, for example moving the focal point over the welding region. In the case of a hollow profile having a diameter of 4 mm, the diameter of the laser beam can accordingly be 400 µm, for example, preferably 200 µm or less. The term "cross-sectional dimensions" used in the present description may refer to a diameter of a hollow profile or to edge lengths. Depending on the context, the term may also refer to bending radii of edges or the like.

The high local energy density at the impingement point of the laser beam on the workpiece causes local melting of the material to both sides of the abutting edge, with the result that the melts flow into one another. The material solidifies again when it is no longer struck by the laser beam, and forms the weld seam. Since the hollow profile in which the cable core is received is guided continuously past the static laser, a continuous weld seam that connects the two edges is created. In order to prevent an uncontrolled flow-off of the liquid material, which is indeed present with a small wall thickness, the laser power introduced and the speed at which the tube is guided past the laser must be coordinated with one another. With suitable coordination, smooth weld seams that do not require any reworking are formed at the outer side and at the inner side.

By contrast with known arc welding in accordance with the tungsten inert gas method (TIG) or metal inert gas method (MIG), which prevent the melt from reacting with the ambient air by way of the inert gas atmosphere, and thus make high levels of seam quality possible, the laser welding used in the invention makes it possible even without shielding gases for nonferrous metals having material thicknesses smaller than 0.15 mm to be butt-welded to one another such that that no weld bead forms on the inner side of the tube, which inner side is no longer freely accessible because of the cable core, as a result of the better controllability of the energy input. In embodiments of the method, the welding point may nevertheless be flowed around or covered by an inert shielding gas, for example argon. The use of a shielding gas atmosphere may be dependent among other things on the material to be welded and its thickness.

The input of energy by the laser can be controlled in open-loop fashion either by way of focusing on a relatively large target area, with the result that the available energy acts on a larger or smaller area as required, or by a particularly tightly focused laser beam being suitably moved back and forth. The focusing on a relatively large target area may also be realized by means of a laser profile which has a central focal point of high intensity and an annular region of lower intensity surrounding the central focal point. In this way, the welding region can be heated and cooled targetedly along a temperature profile, which can result in a cleaner weld seam and can targetedly influence the solidified structure. Furthermore, laser beams can be easily pulsed, with the input of energy being controlled in open-loop fashion, for example by way of the pulse duration and the pulse interval.

Welding by means of a laser, also referred to as heat conduction welding, creates a smooth, rounded weld seam that requires no further reworking. In the case of heat conduction welding, outside the region on which the laser impinges the energy only spreads into the workpiece by heat conduction. The seam depth—depending on the laser power and the thermal conductivity of the material—therefore only amounts to a few tenths of a millimeter to about 1 millimeter. In this respect, the thermal conductivity of the material limits the maximum seam depth. In general, the seam width is greater than the seam depth. If the heat cannot dissipate quickly enough, the processing temperature rises above the is evaporation temperature, such that metal vapor forms, and the weld depth abruptly increases. The process then changes to deep welding.

The quality of the weld seam, which is high by virtue of the finely controllable input of energy into the welding point, at the outer side and especially at the inner side of the tube produced according to the invention, which has no pronounced material bulge along the weld seam, makes it possible to produce coaxial cables with thin wall thicknesses and small diameters in a continuous process.

In one or more embodiments of the method, the width of the supplied strip is measured and a cutting width is adjusted in a manner dependent on the measurement result and a specification value. The width corresponds approximately to the circumference, along the neutral fiber, of the hollow profile forming the outer conductor of the coaxial cable. Here, the specification value can be varied and a shaping device can be correspondingly controlled in a manner dependent on the varying width of the strip, for example in order to adapt the amount of material required for a clean weld seam.

In embodiments of the method, a temperature profile transversely with respect to the weld seam is measured. The measured temperature profile may be used for the open-loop control of the energy that is introduced into the welding point. The measured temperature profile may for example be compared with a specification profile, and the open-loop control of the energy that is introduced may include a variation of the focal diameter, of a path described by the focal point on the welding material, and/or a modification of the pulse duration and/or of the pulse interval of the laser beam. It is likewise conceivable for the supply rate to be controlled in closed-loop fashion in a manner dependent on the measured temperature profile. The measured temperature profile may also be stored for quality management and documentation purposes.

In embodiments of the method, the weld seam is inspected by means of ultrasound, x-rays, an eddy current measurement or other non-destructive measuring methods. The results of the inspection may for example be used for the open-loop control of the energy introduced into the welding point and/or the supply rate.

In embodiments of the method, a tensile force acting on the flat strip of nonferrous metal and/or on the welded coaxial cable is determined, and the previously determined tensile force is used for the closed-loop control of drives that supply the flat strip for the shaping and/or welding operation(s) and/or supply the welded coaxial cable to a corrugating or receiving device. In particular in the case of supplied strips having a very small thickness, excessive tensile force can result in the strip tearing, which would interrupt the process. The same applies for the tensile force acting on the welded coaxial cable.

An apparatus according to the invention for the continuous production of coaxial cables having a thin-walled, radially closed outer conductor of nonferrous metal comprises a supplying device configured to supply a flat strip of the nonferrous metal. The supplying device may for example comprise a mount for a flat strip, made of the nonferrous metal, that is wound on a reel or a coil. The strip is unwound from the reel and supplied to a shaping apparatus, which shapes the flat strip of nonferrous metal into the profile of the hollow profile forming the outer conductor of the coaxial cable such that the opposite edges of the flat strip of nonferrous metal abut flush against one another in a butt-jointed manner. The shaping device may for example have multiple rollers and profiles, for example drawing dies, which shape the strip as it passes through in the longitudinal direction to form the desired hollow profile. The shaping device may furthermore have two or more guide means which are spaced apart from one another in the longitudinal direction of the shaped strip or hollow profile and between which the edges are held so as to lie flush against one another at least at a point that is to be welded. If appropriate, the strip may be guided laterally at one or more points upstream of and in the tool in order to minimize lateral movement of the strip.

The device furthermore comprises a supplying device configured to supply a cable core that is matched to the dimensions of the hollow profile. The cable core comprises an inner conductor encased with a dielectric and possibly further layers. The supplying device supplies the cable core at a rate that is matched to the feed rate of the welded hollow profile.

The apparatus further comprises a welding apparatus, which welds together the edges lying flush against one another between the guide means. The welding device comprises a laser which radiates light having a wavelength smaller than 600 nm with energy which causes local melting of the nonferrous metal to both sides of the edges. On account of the continuous feeding of the shaped and welded hollow profile or of the coaxial cable, regions in which the material has melted leave the region in which the laser heats the material, and the molten material solidifies again. The energy introduced into the material to heat it is coordinated with the material, its thickness and the rate at which the hollow profile or the coaxial cable is guided past the welding point, such that, although the material is melted in a region lying directly at the edges that lie flush against one another, no liquid material runs into the interior of the hollow profile. The spacing between an optical system of the laser and the edges of the hollow profile that are to be welded can be kept constant by way of the guide means. In order to keep the position of the edges abutting against one another constant in relation to the optical system of the laser, upstream of the guide means that close the longitudinal slot there may be what is referred to as a guide blade arranged in the longitudinal slot lying between the edges in order to prevent helical twisting.

The apparatus additionally comprises one or more feeding devices, which convey the welded coaxial cable further to a corrugator which introduces a helical or parallel corrugation into the outer conductor of the coaxial cable before it is conveyed further to a receiving device which receives the coaxial cable. The feeding device may comprise for example one or more draw-off collets, draw-off cleats, draw-off capstans or draw-off belts of known construction, it also being possible to combine different feeding devices. Feeding devices may be arranged both upstream and downstream of the corrugator.

In one or more embodiments of the apparatus, a measuring apparatus for ascertaining the tensile force is provided upstream of the shaping apparatus. The ascertained tensile force can be supplied as an actual value to a closed-loop controller and used, together with a setpoint value, for the closed-loop control of the drives of the apparatus, for example for the closed-loop control of the supply rate of the strip of nonferrous metal. Furthermore, there may be arranged is downstream of the welding device a measuring and/or closed-loop control device which measures the tensile force exerted on the welded hollow profile or coaxial cable and/or controls the drive of the feeding device, which supplies the welded hollow profile to the receiving device, in closed-loop fashion. The tensile force between the feed device and the receiving device may be controlled in closed-loop fashion, for example, by a dancer which detects sagging of the welded hollow profile or coaxial cable and supplies corresponding signals to a drive controller of the receiving device.

In one or more embodiments, the apparatus furthermore comprises a cutting device which is arranged upstream of the shaping device and by means of which one or both edges of the supplied flat strip of nonferrous metal are trimmed, the width of the trimmed strip corresponding to the circumference of the hollow profile forming the outer conductor of the coaxial cable. In these embodiments, it is possible without great outlay to produce hollow profiles for coaxial cables having different circumferences by cutting the supplied metal strip to the required width and adapting the further tools of the apparatus.

In one or more embodiments, parts which have been cut off at one or both edges of the strip may be supplied to an apparatus provided for receiving cutting remains.

In one or more embodiments of the apparatus equipped with a cutting device, a measuring device for measuring the width of the cut-to-size strip is provided downstream of the cutting device. On the basis of the measured values, the cutting device can be controlled in order to maintain a desired width of the nonferrous metal strip over a long period of time. The cutting device may be supplied with corresponding specification values, with which the measured width of the nonferrous metal strip are compared in order to generate a control signal for the setting of the cutting device. The width corresponds approximately to the circumference, along the neutral fiber, of the hollow profile forming the outer conductor of the coaxial cable.

The welding apparatus may be configured to weld the edges together with the required quality even at slow supply rates of the nonferrous metal strip.

In one or more embodiments, the apparatus furthermore comprises a measuring device for determining a temperature profile transversely with respect to the weld seam. The measured temperature profile may be supplied to the welding apparatus for the open-loop control of the energy that is output, to the supplying device, and/or to the feed device for the open-loop control of the supply rate.

In one or more embodiments, the apparatus also comprises a measuring device for measuring at least one dimension of the coaxial cable after the welding. This measuring device may be used for integrated quality control, in the same way as a measuring device, provided in one or more embodiments, for inspecting the weld seam and/or checking for material defects or inhomogeneities of the material. The dimensions may preferably be measured contactlessly, for example by means of a laser.

In one or more embodiments, after it has passed through the corrugator, the corrugated coaxial cable may be encased with an electrical insulation means, such as by encapsulation or wrapping.

The above-described method, in which laser light having wavelengths smaller than 600 nm is used to weld thin-walled, nonferrous metal sheets, makes it possible to easily produce hollow profiles having wall thicknesses below 0.15 mm and diameters or dimensions smaller than 4 mm with a high level of quality and without complex reworking, which hollow profiles can be further processed in the same procedure into coaxial cables by introducing a cable core. The use of focal diameters of the laser beam smaller than 400 μm ensures a sufficiently small heat-affected zone in relation to the dimensions of the hollow profile during continuous welding, with the result that no breakaways of material occur and a weld seam that does not have a pronounced bead on the tube inner side is produced. Because the hollow profile is produced directly from nonferrous metal strips having a small wall thickness, it is possible to dispense with subsequent drawing of the tube for the purpose of reducing the wall thickness, this possibly being problematic on account of the cable core that lies inside the hollow profile in the case of coaxial cables.

The method described above makes it possible to produce coaxial cables with outer conductors having a wall thickness of 0.10 mm at welding rates greater than 6 m/m in without a drawing process that follows the welding, it being possible to keep the quality of the weld seam constant for several hours, with the result that coaxial cables having large lengths can be produced.

The smaller wall thickness of the outer conductor of the coaxial cable results in saving in terms of copper and other alloy elements and thus in the conservation of valuable resources. A decrease in the wall thickness reduces the laser power required for the welding, this in turn being accompanied by energy savings or alternatively allowing the process rate to be increased while maintaining the same laser power.

With regard to the finished product, the thinner wall thickness of the outer conductor likewise proves to be advantageous, as it results in a lower weight per unit of length, which facilitates transport and installation.

The thinner wall thickness furthermore allows for smaller diameters when the outer conductor is being formed. This allows the outer diameter of the cable to be reduced while maintaining the same design. Apart from the further weight reduction, this leads to smaller minimum bending radii and thus to more flexibility in terms of the laying.

BRIEF DESCRIPTION OF THE DRAWING

The invention will be explained in more detail below by way of example on the basis of an embodiment with reference to the accompanying figures. All figures are purely schematic and not to scale. In the figures.

Identical or similar elements are provided with the same or similar reference signs in the figures.

DETAILED DESCRIPTION

Figure 1:
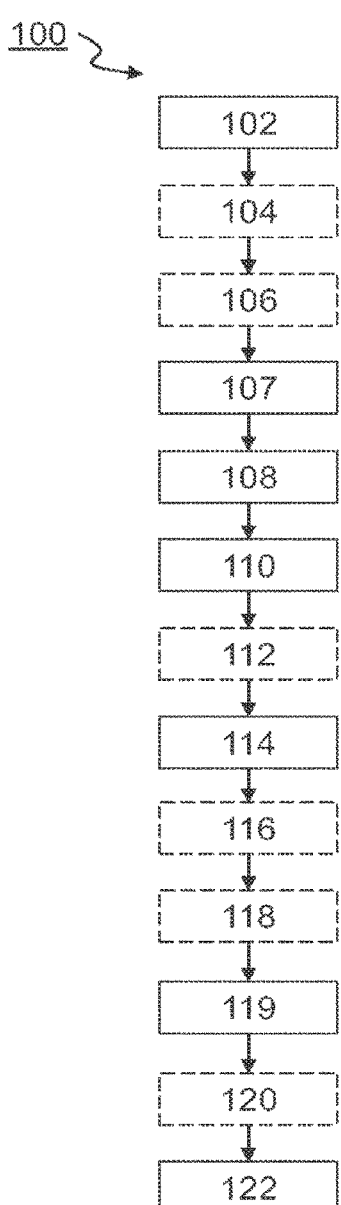
FIG. 1 shows an example of the method according to the invention for the continuous production of thin-walled, radially closed hollow profiles.

FIG. 1 shows steps of a method 100 for producing coaxial cables having a thin-walled, radially closed outer conductor according to one aspect of the invention. In step 102 of the method, a flat strip of nonferrous metal is supplied at a first supply rate to a shaping apparatus. For example, a flat copper strip is unwound from a coil. In the shaping apparatus, the supplied flat strip is shaped in step 108 into a form corresponding to the desired hollow profile of the outer conductor. The shaping may be effected by means of a roll forming tool, for example.

During the shaping, before the hollow profile forming the outer conductor is completely closed, a cable core which comprises an inner conductor encased by a dielectric and, if appropriate, further layers is supplied. The cable core may for example be supplied already in step 107 immediately before the first shaping stage.

Prior to the shaping, an optional step 104, in which one or both edges of the strip of nonferrous metal are trimmed or prepared in some other way, may be performed in a cutting device. In this way, even in the case of poor edge quality of the strip of nonferrous metal, the width of the strip can be uniformly and precisely set, and the edges can if appropriate be prepared for the subsequent welding operation. The cutting device may be supplied with measured values from a measuring apparatus which detects the width of the nonferrous metal strip after the trimming operation. The cutting remains may be received in a corresponding receiving apparatus.

During the shaping, the edges of the strip are guided by means of guide elements such that twisting prior to the welding is prevented, and the edges lying flush against one another are guided in a defined position and with a defined spacing past a welding apparatus. The guide elements may for example comprise one or more fin-type washers or guide blades and one or more guide bushings adapted to the geometry of the hollow profile and adapted to the hollow geometry to be manufactured. The geometry may be closed for example by means of drawing dies, closing rings or side-roller stages.

After the shaping, two opposite edges of the flat strip lie flush against one another in a contact region. In step 110, the edges which lie flush against one another in the contact region are continuously welded to one another. The welding is effected by means of a laser that radiates light having a wavelength smaller than 600 nm. If appropriate, the weld seam may be covered by means of shielding gas in a manner adapted to the required quality of the weld seam.

After the welding, the coaxial cable having the now radially closed outer conductor is drawn off from the welding region, step 114, and in step 119 a helical or parallel corrugation is introduced into the outer conductor before the now corrugated coaxial cable is supplied to a receiving device for receiving purposes in step 122. The drawing off is effected by means of a feed device, for example by means of a draw-off collet, draw-off cleat or draw-off belt. The feed device may be arranged upstream or downstream of the corrugator; it is also possible to provide two feed devices, one upstream and one downstream of the corrugator.

For the monitoring of the quality of the weld seam, it is possible in an optional step 112 for the temperature profile transversely with respect to the weld seam to be determined. The ascertained temperature profile may be supplied to a controller of the laser and to other elements of an apparatus which implements the method, in particular also to one or more drives which perform closed-loop control of the supply rate of the strip of nonferrous metal or the rate at which the welded coaxial cable is drawn off from the welding region.

The method may optionally also comprise an ascertainment of the tensile force on the strip prior to the shaping, step 106, and/or on the coaxial cable after the welding, step 120. The ascertained tensile force may likewise be supplied to one or more drives as a measured variable for the closed-loop control.

The method may furthermore comprise an optional step 116 in which one or more dimensions of the welded coaxial cable are determined. The ascertained dimensions may be supplied especially as input variables for the closed-loop control of the shaping process and of the cutting process for setting the width of the strip.

The method may furthermore comprise an optional step 118 in which the quality of the weld seam and/or the welding material are inspected non-destructively for material defects, for example by means of eddy current inspection, ultrasound or x-rays.

Not illustrated in the figure are subsequent processes by means of which the hollow profile is cut into pieces, the coaxial cable is encased with an insulating layer, or cables are assembled with plugs.

Figure 2:
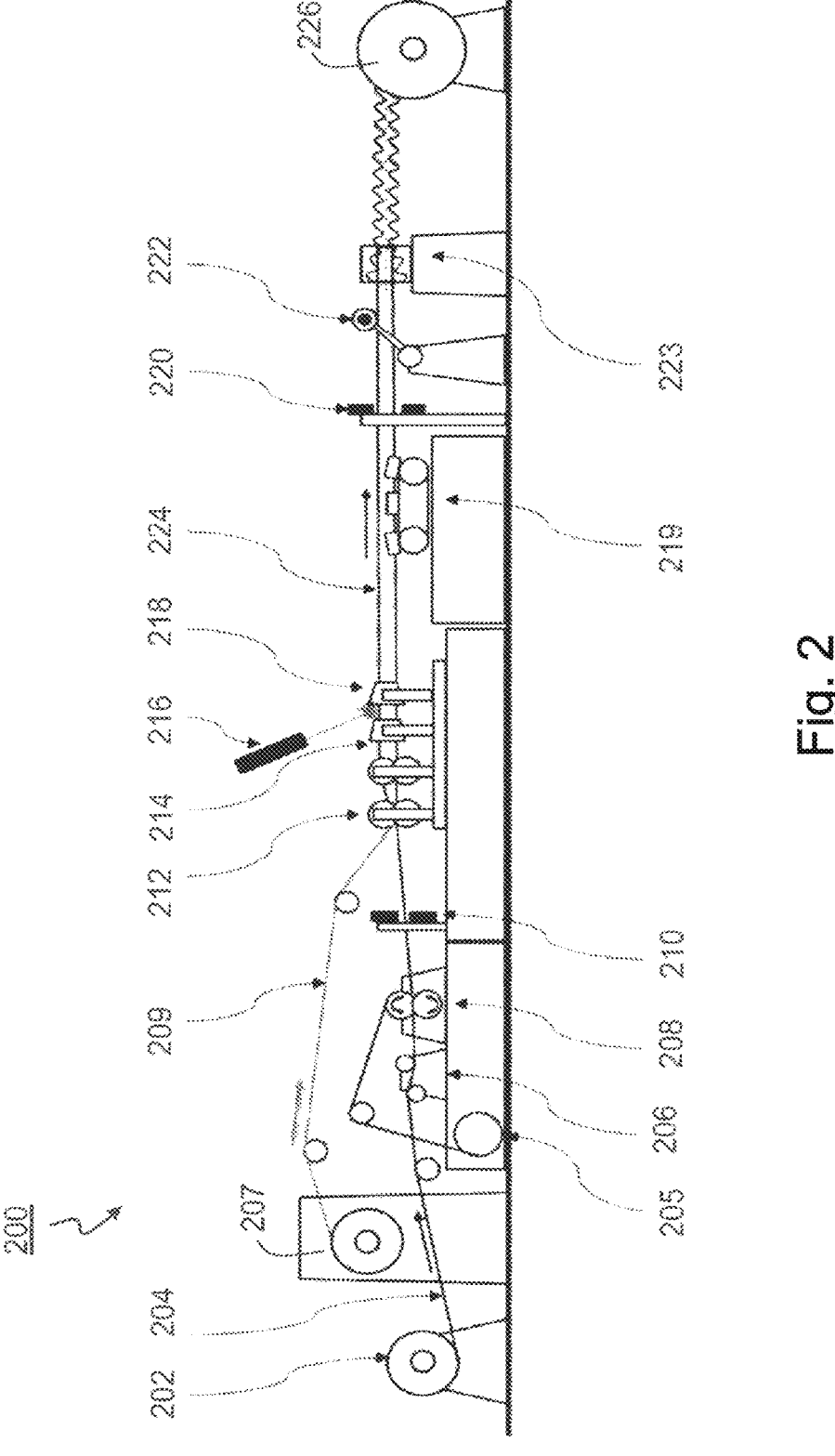
FIG. 2 shows an example of an apparatus according to the invention for the continuous production of thin-walled, radially closed hollow profiles.

FIG. 2 shows an example of an apparatus according to the invention for the continuous production of coaxial cables having a thin-walled, radially closed outer conductor. A thin strip 204 of nonferrous metal, for example a copper strip, is unwound from a reel or unwinder 202. The strip 204 is supplied to a roll forming tool 212, by means of which it is brought into the form of the desired hollow profile of the outer conductor, for example is formed into a longitudinally slotted round tube. Between the reel or unwinder 202 and the roll forming tool 212 there may be provided a cutting apparatus 208, which cuts the strip 204 to a required width or cuts one or both edges of the strip 204 in order to obtain clean and smooth edges. A receiving device 205 may be provided for receiving cut-off parts of the strip 204. The width of the cut-to-size strip 204 may be inspected in a strip width measuring apparatus 210. The measurement results may be supplied to the cutting device 208 for the purposes of closed-loop control. Furthermore, between the coil or unwinder 202 and the roll forming tool 212 there may be arranged a measuring device 206 for ascertaining the tensile force, the measured values of which can be used for example for the closed-loop control of drives of the device. Before the closing of the hollow profile forming the outer conductor, from a supplying apparatus 207 there is supplied a cable core 209, which is received in the hollow profile after the flat strip of nonferrous metal has been shaped. Those edges of the strip that lie against one another after the hollow profile forming the outer conductor has been shaped can be guided in front of the laser welding apparatus 216 by one or more guide elements 214 such that twisting of the hollow profile prior to the welding is prevented, and the spacing with which it passes through below an optical system of the laser welding apparatus 216 is maintained. The guide elements may comprise one or more fin-type washers or guide blades and one or more guide bushings adapted to the hollow profile forming the outer conductor. The geometry of the hollow profile to be welded is closed by means of drawing dies, closing rings, side-roller stages or guide bushings 218, with the result that the edges of the strip 204 that have been shaped to form the hollow profile lie against one another in the region of the laser welding apparatus 216. The laser welding apparatus 216 radiates high-energy light at a wavelength smaller than 600 nm, preferably in a range between 550 and 450 nm. According to the invention, use may also advantageously be made of wavelengths in a range below 450 nm. The welding region may be covered with a shielding gas, for example argon, by means of a shielding-gas apparatus, not illustrated in the figure, in order to prevent reactions of the welding material with the atmosphere. The welded coaxial cable 224 is supplied by means of a feed device 219. The feed device 219 may for example comprise one or more draw-off collets, draw-off cleats, draw-off capstans or draw-off belts, or combinations of these. Before the welded coaxial cable 224 is wound up on a winder 226, one or more dimensions of the coaxial cable 224 may be detected, preferably contactlessly, by means of a measuring unit 220, and a helical or parallel corrugation may be introduced into the coaxial cable by means of a corrugator 223. In order to detect the tensile forces acting on the coaxial cable 224, a further tensile-force measuring apparatus 222 may be provided upstream of the winder 226.

Figure 3:
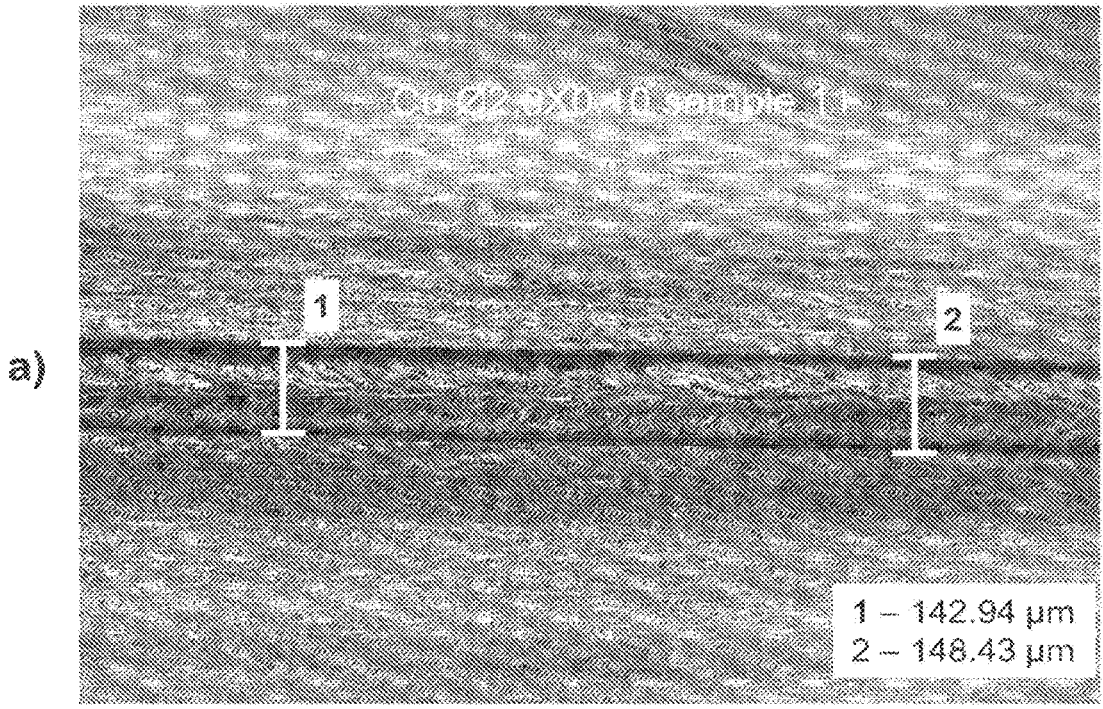
FIG. 3 shows images of a weld seam of a hollow profile produced by the method according to the invention.
Figure 3:
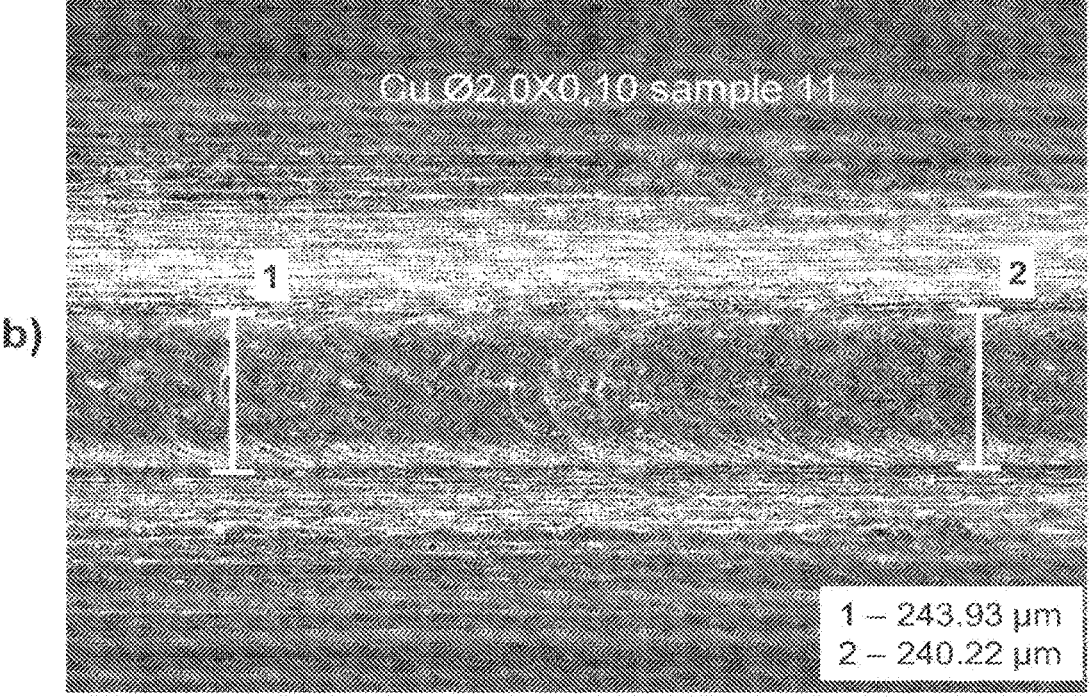

FIG. 3 shows images of a weld seam of a hollow profile produced by the method according to the invention. The hollow profile is a copper tube having a wall thickness of 0.1 mm, which at a feed rate of 6 m/min was continuously shaped from a copper strip and welded. In this context, the welding point was covered with argon. FIG. 3 *a*) shows the weld seam, which has a width of between 140 and 150 μm, on the outer side of the hollow profile. FIG. 3 *b*) shows a photograph of the inner side, on which the weld seam has a width of about 242 μm, of the hollow profile. It can also clearly be seen that the weld seams are very uniform both on the inside and on the outside, with the result that reworking should not be necessary for most usage situations.

Figure 4:
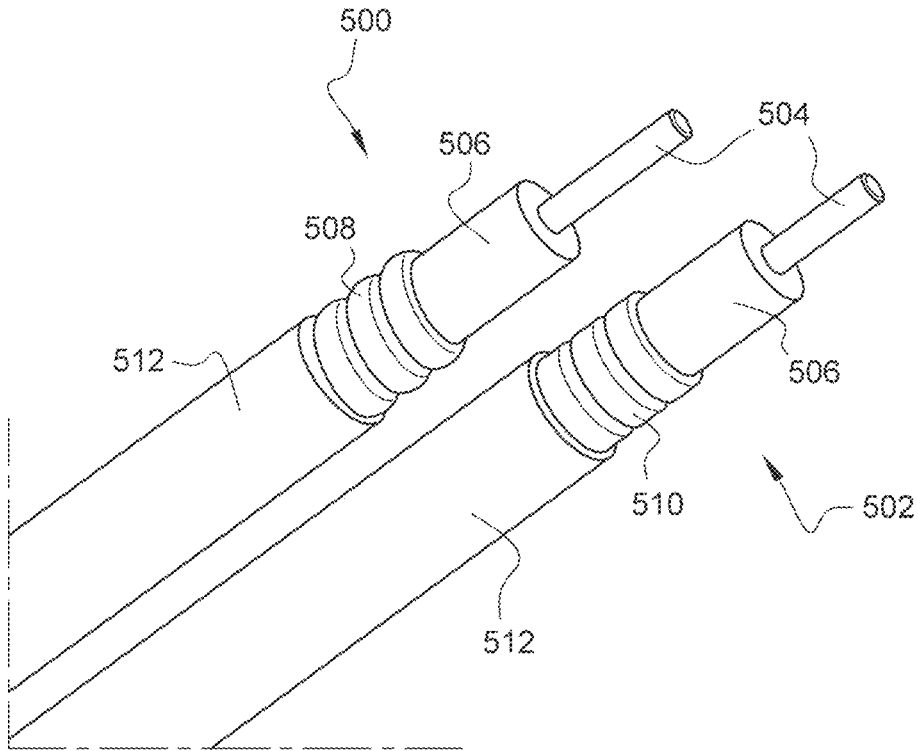
FIG. 4 shows two exemplary coaxial cables having a helical and a parallel corrugation, respectively.

FIG. 4 shows two exemplary coaxial cables 500, 502 having a helical corrugation and a parallel corrugation, respectively. The coaxial cables 500, 502 are otherwise of conventional construction, having an inner conductor 504, surrounded by a dielectric 506, and outer conductors 508 and 510 which have helical corrugations and parallel corrugations, respectively. The outer conductors 508, 510 are surrounded by an outer insulating layer 512.

| List of reference signs | |
| --- | --- |
| 1 | Tube |
| 2 | Form |
| 3 | Plug |
| 100 | Method |
| 102 | Supplying the strip |
| 104 | Determining the tensile force |
| 106 | Trimming the edges |
| 107 | Supplying cable core |
| 108 | Forming the hollow profile |
| 110 | Welding operation |
| 112 | Determining the temperature profile |
| 114 | Drawing off the hollow profile |
| 116 | Determining the dimensions |
| 118 | Determining the quality |
| 119 | Corrugations |
| 120 | Determining the tensile force |
| 122 | Supplying to the receiving device |
| 200 | Apparatus |
| 202 | Winder/unwinder |
| 204 | Strip of nonferrous metal |
| 205 | Receiving apparatus for offcuts |
| 206 | Tensile force measuring apparatus |
| 207 | Supplying apparatus |
| 208 | Cutting device |

-continued

| List of reference signs | |
| --- | --- |
| 209 | Cable core |
| 210 | Strip width measuring apparatus |
| 212 | Roll forming tool |
| 214 | Guide element |
| 216 | Laser welding apparatus |
| 218 | Drawing die/guide bushings |
| 219 | Feed device |
| 220 | Measuring unit |
| 222 | Tensile force measuring apparatus |
| 223 | Corrugator |
| 224 | Coaxial cable |
| 226 | Winder |
| 500 | Coaxial cable (helical corrugation) |
| 502 | Coaxial cable (parallel corrugation) |
| 504 | Inner conductor |
| 506 | Dielectric |
| 508 | Outer conductor |
| 510 | Outer conductor |
| 512 | Insulating layer |

The invention claimed is:

1. A method for continuous production of coaxial cables having a radially closed outer conductor of a nonferrous metal that has a wall thickness of less than 0.15 mm, comprising:

supplying a flat strip of the nonferrous metal at a first supply rate to a shaping apparatus, wherein a thickness of the flat strip corresponds to the wall thickness of a hollow profile of the outer conductor to be produced;

supplying an inner conductor encased with a dielectric;

in a shaping operation, continuously shaping the supplied flat strip into a form corresponding to the outer conductor of the coaxial cable, wherein after the shaping operation two opposite edges of the flat strip lie flush against one another in a contact region extending in a longitudinal direction of the hollow profile, and wherein before closing of the hollow profile forming the outer conductor, the inner conductor encased by the dielectric is supplied, with a result that the inner conductor encased by the dielectric lies in the hollow profile;

in a welding operation, continuously welding the edges that lie flush against one another in the contact region, wherein the edges to be welded are guided at the first supply rate past a welding region that is stationary in relation to an apparatus which implements the method, and wherein a point in the welding region is heated by means of a laser which radiates light having a wavelength smaller than 600 nm to dispense with preparation of the welding region to reduce optical reflections, and wherein the heated point has a diameter which is less than 20% of a cross-sectional dimension of the hollow profile;

drawing off the welded coaxial cable from the welding region;

in a corrugating operation, introducing a helical or parallel corrugation into the outer conductor of the coaxial cable without reducing the cross-sectional dimension and/or the wall thickness prior the corrugating operation, by a drawing process that follows the welding; and in a receiving operation, receiving the coaxial cable in a receiving device.

2. The method as claimed in claim 1, wherein at least the welding region is flowed around or covered by an inert shielding gas during the heating.

3. The method as claimed in claim 1, further comprising: inspecting the weld seam by means of ultrasound, eddy current measurement and/or x-rays.

4. A method for continuous production of coaxial cables having a radially closed outer conductor of a nonferrous metal that has a wall thickness of less than 0.15 mm, comprising:

supplying a flat strip of the nonferrous metal at a first supply rate to a shaping apparatus, wherein a thickness of the flat strip corresponds to the wall thickness of a hollow profile of the outer conductor to be produced;

supplying an inner conductor encased with a dielectric;

in a shaping operation, continuously shaping the supplied flat strip into a form corresponding to the outer conductor of the coaxial cable, wherein after the shaping operation two opposite edges of the flat strip lie flush against one another in a contact region extending in a longitudinal direction of the hollow profile, and wherein before closing of the hollow profile forming the outer conductor, the inner conductor encased by the dielectric is supplied, with a result that the inner conductor encased by the dielectric lies in the hollow profile;

in a welding operation, continuously welding the edges that lie flush against one another in the contact region without prior treatment to reduce optical reflections, wherein the edges to be welded are guided at the first supply rate past a welding region that is stationary in relation to an apparatus which implements the method, and wherein a point in the welding region is heated by means of a laser which radiates light having a wavelength smaller than 600 nm, and wherein the heated point has a diameter which is less than 20% of a cross-sectional dimension of the hollow profile;

drawing off the welded coaxial cable from the welding region;

in a corrugating operation, introducing a helical or parallel corrugation into the outer conductor of the coaxial cable, without reducing the cross-sectional dimension and/or the wall thickness prior to the corrugating operation, by a drawing process that follows the welding; in a receiving operation, receiving the coaxial cable in a receiving device; and trimming one or two of the edges of the flat strip of nonferrous metal before the shaping operation.

5. The method as claimed in claim 4, further comprising:

measuring a width of the trimmed strip of nonferrous metal prior to the welding and/or measuring at least one dimension of the coaxial cable after the welding, and controlling the width in closed-loop fashion and/or controlling an apparatus for the purpose of shaping in a manner dependent on the measuring of the width and/or measuring the at least one dimension and a specification value.

6. A method for continuous production of coaxial cables having a radially closed outer conductor of a nonferrous metal that has a wall thickness of less than 0.15 mm, comprising:

supplying a flat strip of the nonferrous metal at a first supply rate to a shaping apparatus, wherein a thickness of the flat strip corresponds to the wall thickness of a hollow profile of the outer conductor to be produced;

supplying an inner conductor encased with a dielectric;

in a shaping operation, continuously shaping the supplied flat strip into a form corresponding to the outer conductor of the coaxial cable, wherein after the shaping operation two opposite edges of the flat strip lie flush against one another in a contact region extending in a longitudinal direction of the hollow profile, and wherein before the closing of the hollow profile forming the outer conductor, the inner conductor encased by the dielectric is supplied, with a result that the inner conductor encased by the dielectric lies in the hollow profile;

in a welding operation, continuously welding the edges that lie flush against one another in the contact region without prior treatment to reduce optical reflections, wherein the edges to be welded are guided at the first supply rate past a welding region that is stationary in relation to an apparatus which implements the method, and wherein a point in the welding region is heated by means of a laser which radiates light having a wavelength smaller than 600 nm, and wherein the heated point has a diameter which is less than 20% of a cross-sectional dimension of the hollow profile;

drawing off the welded coaxial cable from the welding region;

in a corrugating operation, introducing a helical or parallel corrugation into the outer conductor of the coaxial cable, without reducing the cross-sectional dimension and/or the wall thickness prior to the corrugating operation, by a drawing process that follows the welding; in a receiving operation, receiving the coaxial cable in a receiving device; and measuring a temperature profile transversely with respect to the weld seam and controlling energy introduced into the welding region in open-loop fashion in a manner dependent on a comparison of the temperature profile with a specification profile.

7. A method for continuous production of coaxial cables having a radially closed outer conductor of a nonferrous metal that has a wall thickness of less than 0.15 mm, comprising:

supplying a flat strip of the nonferrous metal at a first supply rate to a shaping apparatus, wherein a thickness of the flat strip corresponds to the wall thickness of a hollow profile of the outer conductor to be produced;

supplying an inner conductor encased with a dielectric;

in a shaping operation, continuously shaping the supplied flat strip into a form corresponding to the outer conductor of the coaxial cable, wherein after the shaping operation two opposite edges of the flat strip lie flush against one another in a contact region extending in a longitudinal direction of the hollow profile, and wherein before the closing of the hollow profile forming the outer conductor, the inner conductor encased by the dielectric is supplied, with a result that the inner conductor encased by the dielectric lies in the hollow profile;

in a welding operation, continuously welding the edges that lie flush against one another in the contact region without prior treatment to reduce optical reflections, wherein the edges to be welded are guided at the first supply rate past a welding region that is stationary in relation to an apparatus which implements the method, and wherein a point in the welding region is heated by means of a laser which radiates light having a wavelength smaller than 600 nm, and wherein the heated point has a diameter which is less than 20% of a cross-sectional dimension of the hollow profile;

drawing off the welded coaxial cable from the welding region;

in a corrugating operation, introducing a helical or parallel corrugation into the outer conductor of the coaxial cable, without reducing the cross-sectional dimension and/or the wall thickness prior to the corrugating operation, by a drawing process that follows the welding;

in a receiving operation, receiving the coaxial cable in a receiving device;

determining a tensile force on the flat strip of the nonferrous metal and/or the welded coaxial cable; and controlling, in closed-loop fashion, drives that supply the flat strip and/or the welded coaxial cable to the shaping operation, the welding operation, the corrugating operation and/or the receiving operation in a receiving apparatus.

* * * * *